Figure 5:
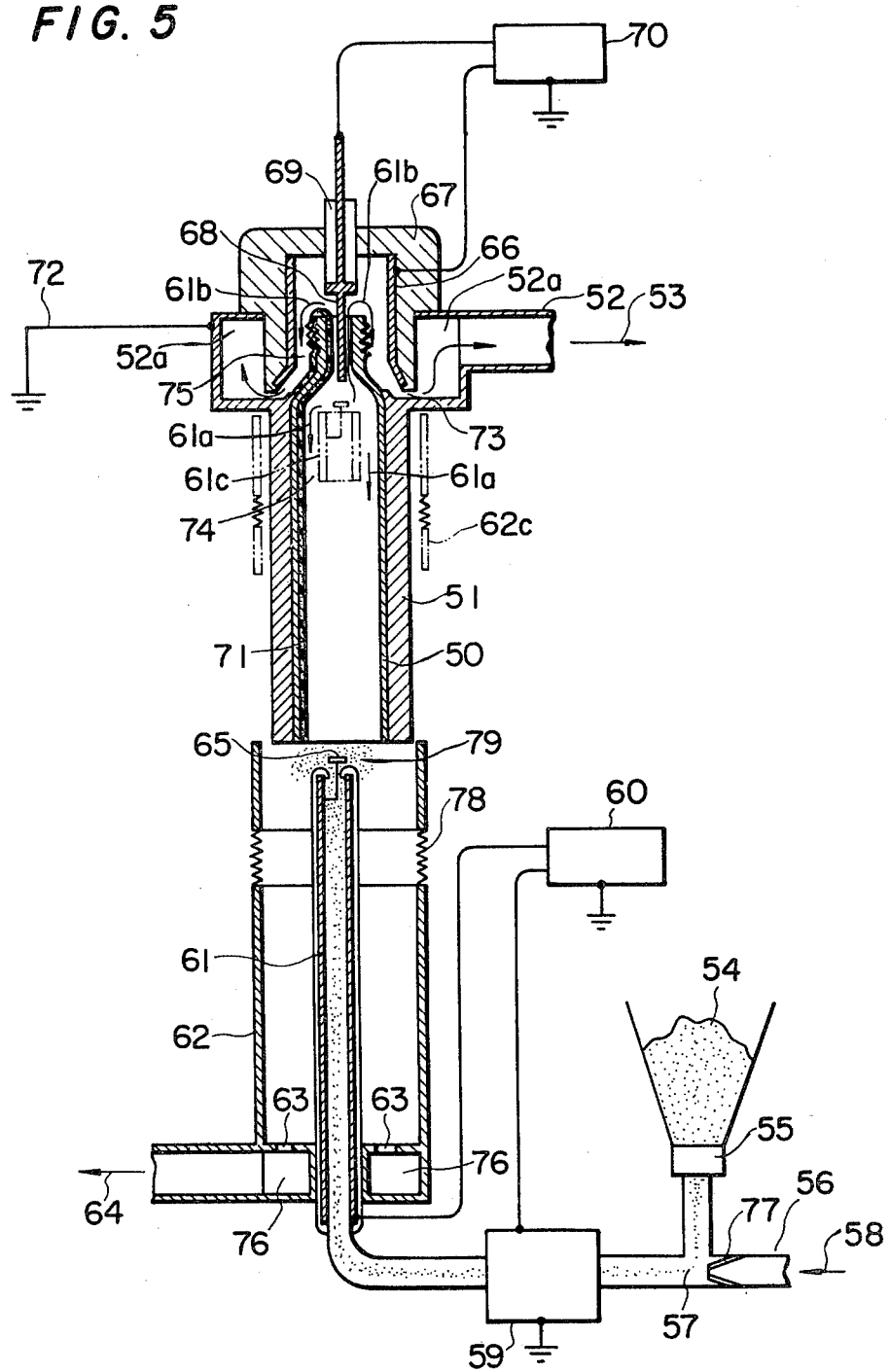

United States Patent [19]

Itoh et al.

[11] 4,213,541
[45] Jul. 22, 1980

[54] METALLIC SQUEEZE-OUT TUBE WITH RESINOUS LAYER ON ITS SURFACE

[75] Inventors: Tsutomu Itoh, Tokyo; Nobuo Furuya; Kenji Ohuchi, both of Chiba, all of Japan

[73] Assignee: Onoda Cement Co., Ltd., Onoda, Japan

[21] Appl. No.: 827,890

[22] Filed: Aug. 26, 1977

Related U.S. Application Data

[63] Continuation of Ser. No. 762,504, Jan. 26, 1977, Pat. No. 4,112,869.

[30] Foreign Application Priority Data

Feb. 3, 1976 [JP] Japan .................. 51-010005
Mar. 8, 1976 [JP] Japan .................. 51-024867

[51] Int. Cl.² ............................................. B65D 35/16
[52] U.S. Cl. ........................................ 222/92; 220/457
[58] Field of Search ............. 222/107, 92; 220/457, 220/304; 428/35, 36

[56] References Cited

U.S. PATENT DOCUMENTS

| | | | |
|---|---|---|---|
| 2,411,024 | 11/1946 | Bruun | 222/92 X |
| 2,686,616 | 8/1954 | Barlow | 222/107 |
| 2,860,801 | 11/1958 | Nielsen | 220/457 X |
| 3,817,427 | 6/1974 | Neff et al. | 222/107 |
| 4,032,043 | 6/1977 | Lajovic | 222/92 |

*Primary Examiner*—Stanley H. Tollberg
*Attorney, Agent, or Firm*—Price, Heneveld, Huizenga & Cooper

[57] ABSTRACT

A novel metallic squeeze-out tube suitable for packing paste-like foods whose flavor is regarded as important or the like is described herein, in which a resin powder layer is formed on its inner surface and on the outer surface of its neck portion by electrostatic painting and thereafter it is finished by baking, whereby a resin coating film that is free from pin holes and has a strong corrosion resistance can be formed. Also a novel apparatus for forming a resin powder layer for such metallic squeeze-out tube is described, in which a cylindrical high voltage electrode is disposed in the proximity of an outer surface of a neck portion of an unprocessed metallic squeeze-out tube, a rod-shaped electrode to be inserted concentrically to the interior of the neck portion is provided if the inner diameter of the neck portion is large, a cylindrical high voltage electrode that is vertically movable and adapted to eject resin powder is disposed in the interior of the body portion of the squeeze-out tube, and further, air flows at the various portions in the metallic squeeze-out tube are adjusted so as to continuously form a powder layer.

8 Claims, 12 Drawing Figures

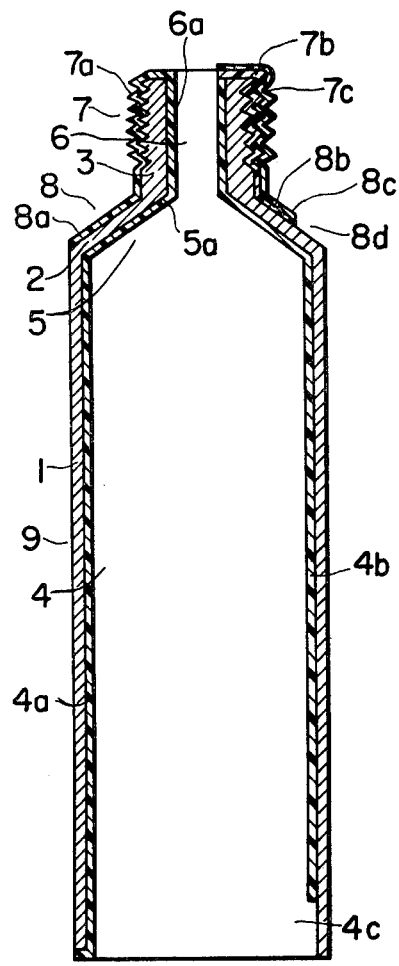
FIG. 1
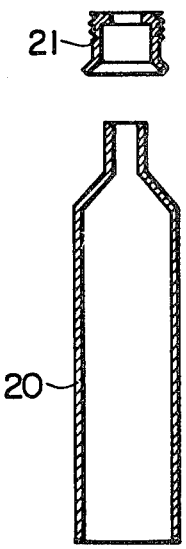
FIG. 3
FIG. 2
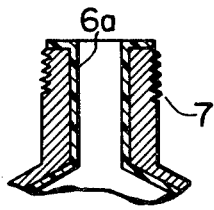
FIG. 4
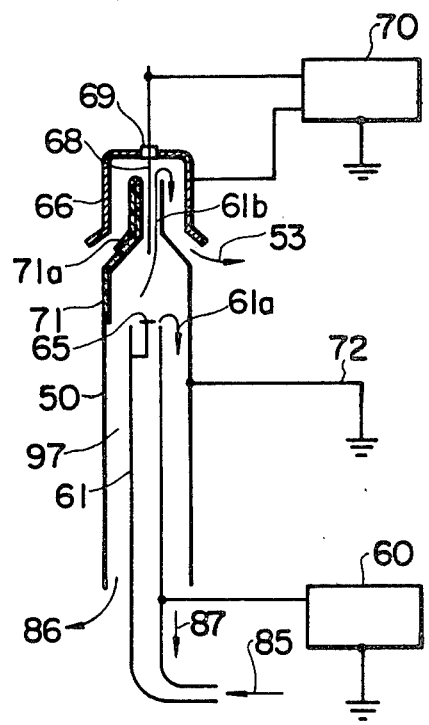

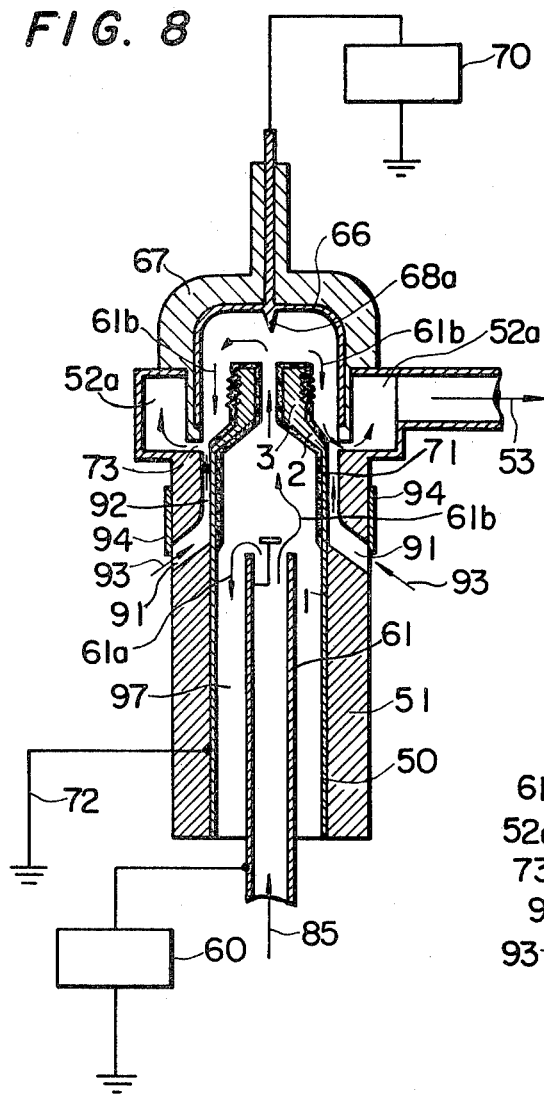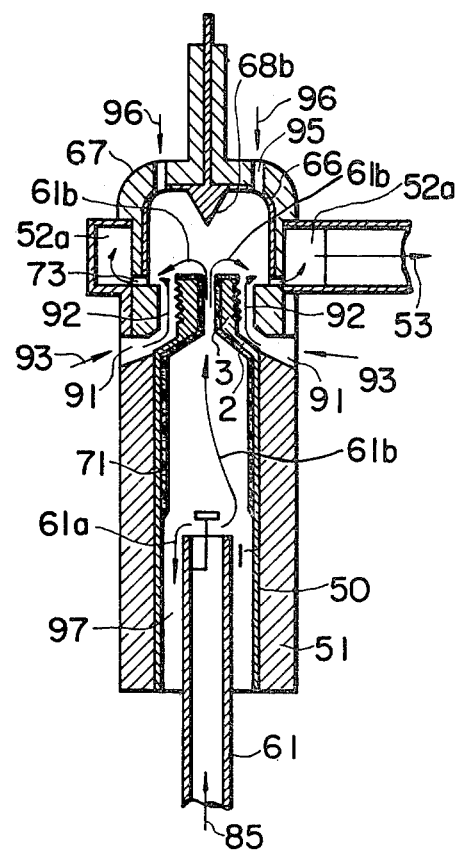

METALLIC SQUEEZE-OUT TUBE WITH RESINOUS LAYER ON ITS SURFACE

CROSS REFERENCE TO RELATED APPLICATION

This is a continuation of application Ser. No. 762,504 filed Jan. 26, 1977, now U.S. Pat. No. 4,112,869.

The present invention relates to a metallic squeeze-out tube for packing paste-like foods whose flavor is regarded as important or the like characterized in that after a charged continuous powder resin layer has been formed over the inner surface, the outer surface of the neck portion and the outer surface of the shoulder portion of said metallic squeeze-out tube, said powder resin layer is baked to form a continuous resin coating film adhered tightly onto said respective surfaces, and also relates to an apparatus to be used in the manufacture of said metallic squeeze-out tube for forming a resin powder layer on said respective surfaces of the metallic squeeze-out tube.

Such type of metallic squeeze-out tube has a very excellent property as a container for foods whose flavor is regarded as important, since suction of external air after squeeze-out is small because of its shape-preservability and thereby contact between the contents of the tube and the external air can be minimized. However, among the materials to be packed in such tubes, there are many varieties of materials which are corrosive to aluminum or the like that are used as a raw material for the metallic squeeze-out tube. In order to prevent the corrosion, heretofore the method has been employed in which after the inner surface of the metallic squeeze-out tube has been sprayed and coated with liquid epoxy resin, epoxy phenol resin or the like, the coating is baked to make the inner surface of the squeeze-out tube corrosion resistance. In the case of employing this method, since the thickness of the film that can be formed is thin, its corrosion resistance is not sufficient, and especially, during a shaping process of a metallic squeeze-out tube, tear-off would occur on the inner surface of the shoulder portion and the neck portion, pin holes being apt to arise especially in these portions, so that it was substantially impossible to obtain a perfect corrosion resistance through such method. Furthermore, in the case of this method, sometimes it was impossible to prevent corrosion at the screw thread portion on the outer surface of the neck portion to which the contents adhere inevitably. As another method for resolving these problems, it has been commonly practiced that as shown in FIG. 3, a flexible inner tube 20 produced as by extrusion shaping (hereinafter referred to as "fitting tube") is inserted along the inner surface of the metallic squeeze-out tube, and also in order to protect the screw thread portion, a screw protecting part 21 produced likewise, as by extrusion shaping, is used as fitted around the neck portion. However, in the case of employing this method, these is a disadvantage in that the shape-preservability of the metallic squeeze-out tube is badly affected both because it is difficult to make the thickness of the fitting tube 20 extremely thin and because the fitting tube does not make a tight contact with the metallic squeeze-out tube. Furthermore, a serious disadvantage associated with this method was that in a metallic squeeze-out tube that is once opened, the contents would enter between the metallic squeeze-out tube and the fitting tube mainly from the neck portion and the lower end portion of the fitting tube, so that corrosion is apt to occur at the neck portion and the lower end portion of the metallic squeeze-out tube and thereby effective use of the contents would become impossible within a short period of time. In addition, in production of the fitting tube 20 and the screw protecting part 21 as shown in FIG. 3, it is impossible to reduce their thickness exceeding a certain extent, so that the anti-corrosion parts such as the fitting tube 20 and the screw protecting part 21 which must be used are considerably thicker than the film thickness necessary for anti-corrosion effect which is the essential purpose of said parts and this is very undesirable in view of the amount of resin used.

In addition, besides the above-described two methods, a method of producing a corrosion-resistive tube characterized in that a resin coating is formed over both its inner and outer surfaces by making a pre-heated metallic tube pass through pulverized synthetic resin that the diffused within a box, has been proposed. However, according to this method, since a major portion of a metallic squeeze-out tube is essentially very thin and the heat capacity of such portion is very small, it is difficult to form a uniform coating film over the entire tube. In addition, if a film of sufficient thickness is formed at the body portion of the metallic squeeze-out tube, then excessive resin adheres especially onto the outside of the screw thread portion of the neck portion which is a thick portion having a large heat capacity, resulting in an extremely thick film, so that corrective machining would become necessary for fitting a cap, and on the other hand, it is difficult to form a resin layer of sufficient thickness on the inside of the neck portion. Furthermore, according to this method, normally pre-heating of a metallic squeeze-out tube up to 170° C. to 250° C. is required, and in the case of such pre-heating, if the per-heating operation is conducted afer printing has been preliminarily made on the outer surface of the metallic squeeze-out tube, a disadvantage would occur in that in the case of conventional printing ink, color variation of the ink is invitable. Otherwise, in case of carrying out printing after the outer surface of the metallic squeeze-out tube has been coated with resin, the scope of selection of available printing ink and available printing apparatuses becomes extremely narrow in comparison to the case of directly printing on the surface of the metallic squeeze-out tube because of unevenness of the resin surface and other causes, and it becomes difficult to apply beautifying outer decoration to the metallic squeeze-out tube, so that this method of coating is limited with respect to its applicable field.

One object of the present invention is to eliminate the disadvantages of the prior art methods as described above and to provide a metallic squeeze-out tube having a strong anti-corrosion property to be used for a highly corrosive material.

Another object of the invention is to eliminate the necessity of a coating film on the outer surface of a body portion of a metallic squeeze-out tube and thereby utilize good surface printing.

Still another object of the present invention is to provide an apparatus for forming a powder layer, in which there are provided electrodes partly adapted to the shape of a metallic squeeze-out tube, a control flow of powder material so a coating film free from unevenness and pin holes can be obtained.

The metallic squeeze-out tube according to the present invention has a continuous tightly adhered synthetic resin coating film formed over the inner surface of its body portion, the inner and outer surfaces of its shoulder portion and the inner and outer surfaces of its neck portion; and the apparatus for forming a powder layer on the surface of said metallic squeeze-out tube according to the present invention is an apparatus for forming a powder layer, in which a charged particle feeder pipe is disposed within an unprocessed metallic squeeze-out tube in a vertically movable manner so as to eject charged resin powder from its opening, a high voltage is applied between said charged particle feeder pipe and said unprocessed metallic squeeze-out tube to make charged particles to be adhered onto the inner surface of the unprocessed metallic squeeze-out tube, and on the inside and outside of the neck portion are disposed concentric electrodes one of which is cap-shaped, to control upward and downward flows of a mixture consisting of powder and gas ejected from the top opening of said charged particle feeder pipe, whereby a product free from unevenness and pin holes can be obtained.

Figure 6:
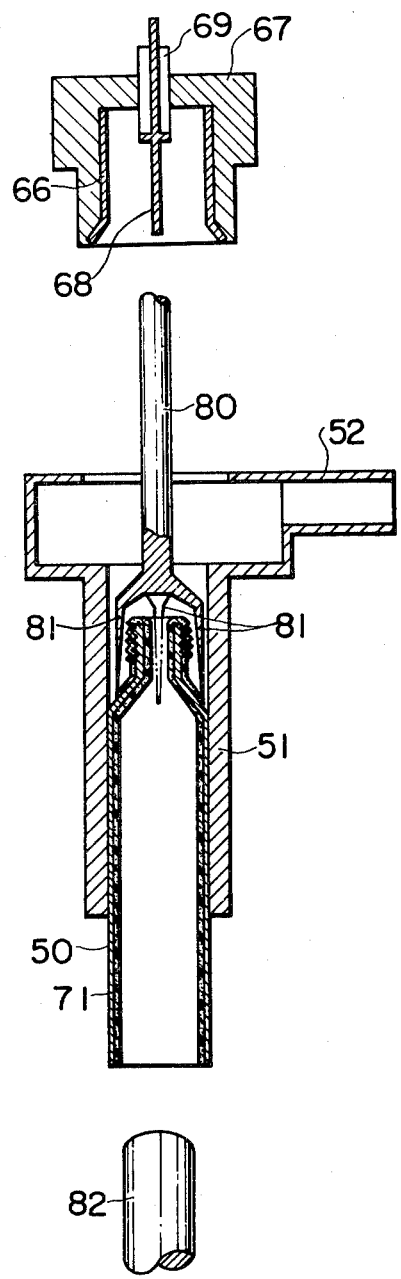
Figure 7:
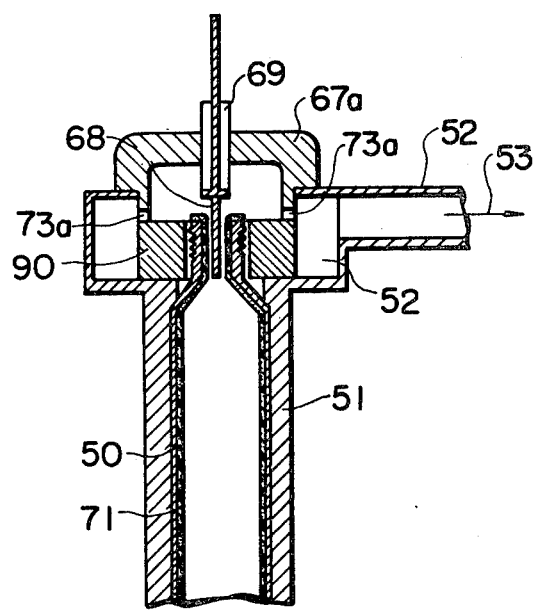
Figure 10:
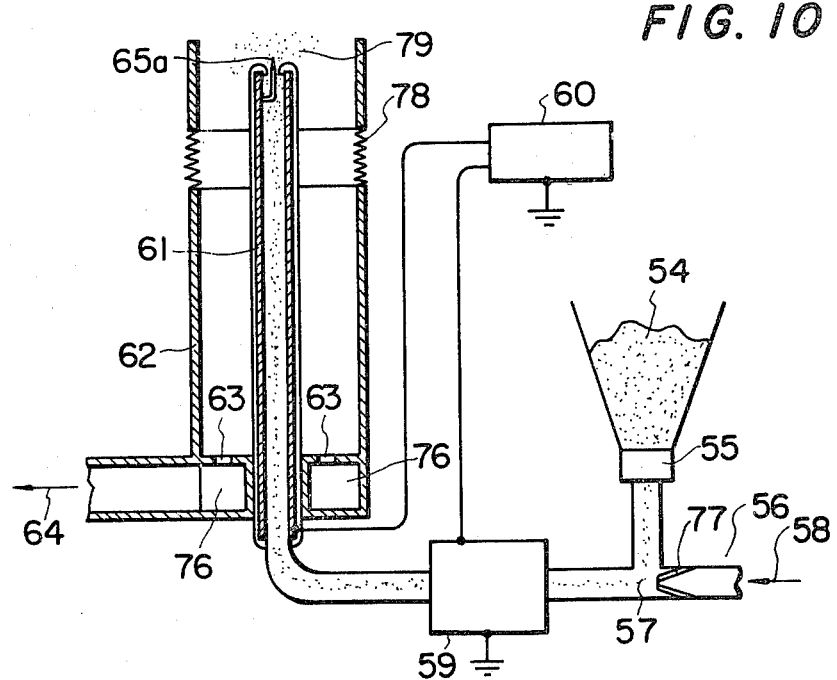
Figure 11:
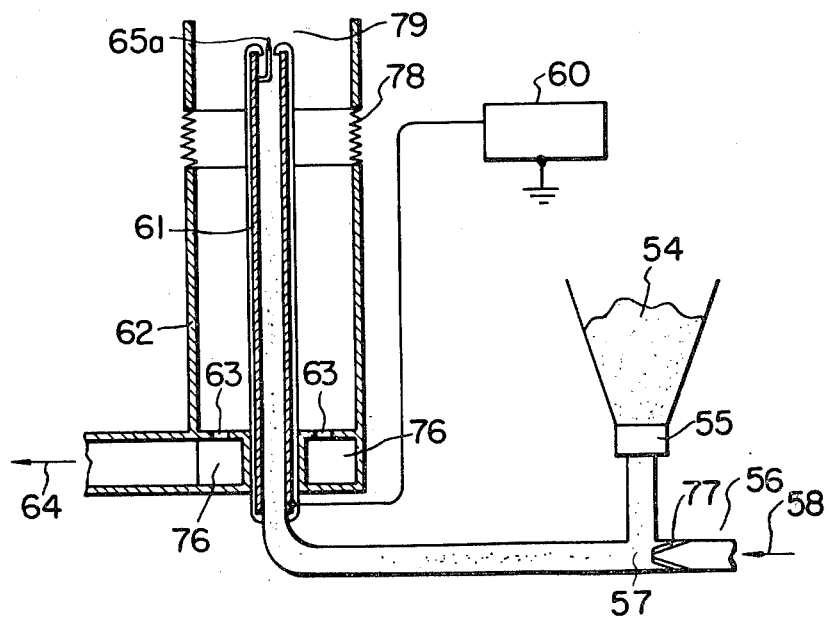
Figure 12:
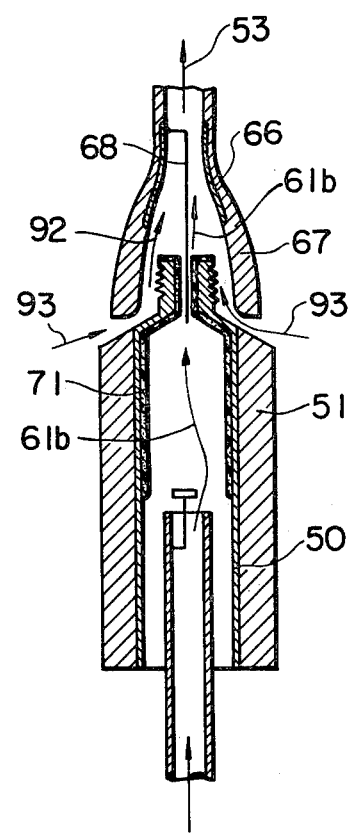

Above-mentioned and other features and objects of this invention will become more apparent by reference to the following description taken in conjunction with the accompanying drawings, in which:

FIG. 1 is a longitudinal cross-section view of a metallic squeeze-out tube according to one preferred embodiment of the present invention, FIG. 2 is a longitudinal cross-section view showing a part of another preferred embodiment of the invention, FIG. 3 is a longitudinal cross-section view of an inner tube and a screw thread protecting part to be used in a squeeze-out tube that is outside of the scope of the present invention, FIG. 4 is a schematic view showing the principle of production of the squeeze-out tube according to the present invention, FIG. 5 is a longitudinal cross-section view of an apparatus for producing a metallic squeeze-out tube according to one preferred embodiment of the present invention, FIG. 6 is a longitudinal cross-section view showing a different state of a part of the apparatus shown in FIG. 5, FIG. 7 is a longitudinal cross-section view showing a modified embodiment of a part of the apparatus shown in FIG. 5, FIG. 8 is a longitudinal cross-section view of a manufacturing apparatus according to another preferred embodiment of the present invention, FIG. 9 is a longitudinal cross-section view of a manufacturing apparatus according to still another preferred embodiment of the present invention, FIG. 10 is a longitudinal cross-section view of a manufacturing apparatus provided with another type of charging means, FIG. 11 is a longitudinal cross-section view of a manufacturing apparatus provided with still another type of charging means, and FIG. 12 is a longitudinal cross-section view of a manufacturing apparatus according to further preferred embodiment of the present invention.

Referring now to FIG. 1 of the drawings, one example of the metallic squeeze-out tube according to the present invention is illustrated in the left half, while another example of a metallic squeeze-out tube according to the present invention is illustrated in the right half. The metallic squeece-out tube according to the present invention has a continuous synthetic resin coating film as represented by reference numerals 4a, 5a, 6a, 7a and 8a formed on and tightly adhered to the inner surface 4 of its body portion 1, the inner surface 5 of its shoulder portion 2, the inner surface 6 of its neck portion, the screw thread portion 7 and the outer surface 8 of its shoulder portion 2, respectively. The synthetic resin coating film is not formed on the outer surface 9 of the body portion as a rule. In addition, in the metallic squeeze-out tube, according to the present invention illustrated in the right half of FIG. 1, there exists a portion of the body inner surface that lacks a resin coating film as represented by 4c, and also there exists a portion of the shoulder outer surface that lacks a resin coating film as represented by 8d. Furthermore, the metallic squeeze-out tube according to the present invention illustrated in the right half of FIG. 1 is characterized in that synthetic resin coating film layers 7c and 8c having a high abrasion resistance are formed outside of the synthetic resin coating films 7b and 8c at the screw thread portion and the shoulder portion, respectively.

The reason why the portions 8d and 4c uncoated by the synthetic resin film and shown in the right half of FIG. 1 exist, is mainly because upon forming the coating films on the squeeze-out tube, sometimes it is more convenient for the purpose of manufacturing to provide either one or both of the uncoated portions 8d and 4c, depending upon the structure of the device for holding the squeeze-out tube per se.

The outer surface 9 of the body portion does not generally require a coating film for anti-corrosion purposes, and in the case of applying beautifying printing on the portion 9, it is economically more advantageous to apply such treatment as required directly to the metallic squeeze-out tube, so that in the metallic squeeze-out tube according to the present invention, a synthetic resin coating film is not formed on the outer surface 9 of the body portion.

The structure shown in FIG. 2 is one preferred embodiment of the present invention that is applicable to the case where the content material has a relatively weak corrosive property, or to the case where the period of use of the tube is relatively short. In this case, as will be apparent from FIG. 2, a synthetic resin coating film is formed only on the entire inner surface of the metallic squeeze-out tube and on the top end of its neck portion as tightly adhered thereto, while the synthetic resin coating film is not formed on the screw thread portion 7 and the shoulder portion 2.

The squeeze-out tube according to the present invention which has a perfect anti-corrosion property and an appropriate shape-preservability can be easily manufactured at a low cost and in large quantities by means of the apparatus as described in detail in the followings.

The principle of manufacture of the squeeze-out tube according to the present invention is as shown in FIG. 4. More particularly, within a body portion of a metallic squeeze-out tube 50 which has not been subjected to any processing (hereinafter briefly called unprocessed tube) a charged particle feeder pipe 61 is inserted the entire length of the tube and is vertically movable in a substantially concentric manner, and if resin powder is charged and ejected from the opening of the charged particle feeder tube 61 while withdrawing the charged particle feeder pipe, then a powder layer as represented by 71 can be formed on the inner surface of the unprocessed tube 50. This is because a high voltage is applied to the charged particle feeder pipe 61 over its entire length by a high voltage D.C. source 60, and a strong electric field directed from the feeder pipe 61 towards the unprocessed tube 50 is always established between the unprocessed tube 50 which is grounded by a wire 72 and the charged particle feeder pipe 61 over the entire region along the inserted length of the feeder pipe 61. Thus, the charged resin powder particles which are charged and ejected from the opening of the charged particle feeder pipe 61 and which flow in the direction of arrow 61a, are immediately adhered onto the inner surface of the unprocessed tube 50 due to an electrostatic force and thus form a rigid powder layer 71. If a portion of the charged particles ejected from the end opening of the feeder pipe 61 is supplied to the exterior through the neck portion of the unprocessed tube, as shown by arrow 61b, while being conveyed by an air flow generated by any appropriate suction method, and if a rod-shaped electrode 68 is disposed concentrically of the neck portion of the unprocessed tube along substantially the entire length of the neck portion and also a concentric cylindrical electrode 66 is disposed opposite to and separated from the outer surface of the neck portion of the unprocessed tube, these electrodes being supplied with a voltage having the same polarity as the charged particle feeder pipe 61 from the high voltage D.C. source 70, then the charged powder resin particles supplied to the exterior passing through the neck portion due to the suction air flow as represented by arrows 61b and 53, will form a rigid powder layer film on the inner and outer surfaces of the neck portion of the unprocessed tube. Accordingly, if the section air rate is so preset that a resin powder layer 71a of appropriate thickness may be formed on the inner and outer surfaces of the neck portion and on the outer surface of the shoulder portion of the unprocessed tube at the same time the charged particle feeder pipe 61 finishes forming an appropriate powder layer 71 over the entire length of its body portion on the inner surface of the unprocessed tube in the above-described manner, then a charged synthetic resin powder layer can be formed rigidly on the inner surface of the unprocessed tube, on the inner and outer surfaces of the neck portion and on the outer surface of the shoulder portion when the charged particle feeder pipe 61 has finished a series of operations. It is to be noted that in some cases the rod-shaped electrode 68 and the charged particle feeder pipe 61 are provided with a coating of insulator or semi-conductor for the purpose of preventing spark discharge.

In order to regulate the rate of charged particles supplied to the exterior through the neck portion of the unprocessed tube, sometimes a favorable result can be obtained by regulating not only the suction flow 53 but also the exhaust flow 86 discharged from the body end of the unprocessed tube. A member 65 disposed at the opening of the charged particle feeder pipe 61, is a baffle plate for appropriately dispersing the charged resin powder ejected from the opening of the charged particle feeder pipe. The arrow 87 indicates that in the illustrated operating state the charged particle feeder pipe 61 is moving outwardly relative to the unprocessed tube 50, and the arrow 85 indicates the flow of powder resin particles to be supplied to the charged particle feeder pipe 61. In the operating state illustrated in FIG. 4, only the left half of the powder layer 71 formed on the inner and outer surfaces of the unprocessed tube is illustrated, the right half being omitted. Reference numeral 69 designates an insulator for insulating the cylindrical electrode 66 opposite to and separated from the outer surface of the neck portion from the rod-shaped electrode 68 for establishing an electric field inside of the neck portion. This is necessary in case different voltages are applied to the rod-shaped electrode 68 and the cylindrical electrode 66. However, depending upon the shape of the neck portion and shoulder portion of the unprocessed tube, it is not always necessary to apply different voltages to these electrodes, but in some cases the voltage applied to the charged particle feeder pipe 61 and the voltages applied to the cylindrical electrode 66 and the rod-shaped electrode 68 can be made common.

The synthetic resin powder ejected from the charged particle feeder pipe 61 into the interior of the unprocessed tube can be simultaneously subjected to charging as well as formation of a synthetic resin powder layer by making use of corona discharge that is generated from the end opening and/or the baffle towards the inner surface of the unprocessed tube by sharpening the edges of the end opening and the baffle plate 65 or by forming the tip end into a needle shaped electrode 65a as shown in FIG. 10 or FIG. 11. This modification is sometimes employed for powder that is hard to internally change. However, normally a better coating film can be obtained by preliminarily charging synthesized resin powder by means of a particle charging device not shown that is disposed inside of the feeder pipe or outside of the feeder pipe prior to ejection of the synthesized resin powder from the charged particle feeder pipe 61, and thereafter ejecting the charged synthesized resin powder from the end of the feeder pipe 61, without causing a corona discharge directly from the end of the feeder pipe 61 or the baffle plate 65 towards the surface of the unprocessed tube to be painted. Especially, in case a thin coating film is to be formed that is free from pin holes, and is smooth and strong, often a better result can be obtained by preliminarily charging resin powder particles only with an electric field without relaying upon corona discharge and thereafter forming a resin powder layer on the inner surface of the unprocessed tube with charged resin powder particles ejected from the end opening of the feeder pipe.

An inner diameter of a squeeze-out tube is 10 mm in the case of very small ones, normally 15–40 mm in most cases and at most about 50 mm in the case of very large ones. Therefore, when painting the inner suface of such tubes the method for transporting the resin powder fed into the interior of the unprocessed tube through a charged particle feeder pipe 61 is accompanied with difficult problems. More particularly, in case a large amount of air is used for transportation of resin powder through a charged particle feeder pipe 61, because of the small inner diameter of the unprocessed tube, often the powder layer 71 that already has been formed on the inner surface of the unprocessed tube will be scattered by the transporting air ejected from the end of the charged particle feeder pipe 61, so that a stable and rigid powder layer 71 cannot be obtained, and especially, generation of pin holes is often encountered in the proximity of the transitional portion from the shoulder to the neck on the inner surface of the unprocessed tube. In order to resolve problems of this type, a charged particle transporting pipe employing a contact type electric field curtain is used as the charged particle feeder pipe 61, and thereby it becomes possible to stably feed charged powder from the end opening of the transporting pipe into the interior of the unprocessed tube with only a small amount of transporting air, and often a favorable result can be obtained by using such a charged particle transporting pipe.

However, in case a powder layer is formed at the same time on the inner surface of the unprocessed tube and on the inner and outer surfaces of its neck portion according to the present invention, it is necessary to generate a transporting air flow as shown by an arrow 61b through the neck portion of the unprocessed tube by a suction effect as represented by an arrow 53. Therefore, in case only powder particles are fed through the charged particle feeder pipe 61, it becomes impossible to produce an exhaust air flow as represented by an arrow 86, and air will flow inversely in the space between the body portion of the unprocessed tube 50 and the charged particle feeder pipe 61, so that it is necessary to feed air into the interior of the tube 50 through the charged particle feeder pipe 61 at a flow rate matched to the flow rates of the suction air flow as represented by arrow 53 and the exhaust air flow as represented by arrow 86. Accordingly, by appropriately selecting the inner diameter and the suction air flow rate of the charged particle feeder pipe 61, depending upon the geometrical configuration of the unprocessed tube, the shape of the feeder pipe 61 that is determined according to said geometrical configuration of the tube and the processing capability, it becomes possible to transport resin powder through the charged particle feeder pipe 61 without employing a special device.

The device for charging resin powder fed through the charged particle feeder pipe 61 can employ any suitable method such as a method utilizing a corona discharge, a method utilizing a planar ion source, etc. Whatever method is utilized, by applying a D.C. high voltage having the same polarity as the polarity of the charge on the synthetic resin powder to the charged particle feeder pipe 61 and by selecting a magnitude of said D.C. high voltage equal to or higher than the driving voltage used in the powder charging device, contamination caused by powder material accumulated on the inner and outer surfaces of the charged particle feeder pipe 61 during a long continuous operation, can be reduced. Further, in order to eliminate the adverse effect caused by these contaminative accumulated particles, in some cases it is necessary to periodically clean the inner and outer surfaces of the charged particle feeder pipe with a high speed air flow or others.

After a powder layer has been formed according to the method as described in detail above, if the powder layer is subjected to baking in a heating device at a necessary temperature and for a necessary period of time as required by the powder material, then the powder layer is rendered molten and solidified. That is, the coating is fused together resulting in formation of a continuous, rigid synthetic resin coating film on the necessary portions of the squeeze-out tube. Thus, the squeeze-out tube according to the present invention can be completed.

Now an apparatus for manufacturing a squeeze-out tube according to the present invention will be described in detail in connection to its preferred embodiment. With reference to FIG. 5, an unprocessed tube 50 is inserted into the interior of an upright cylindrical masking holder 51 from the below and is fixed thereto. Said masking holder 51 serves as a masking device for preventing a surplus powder layer from being formed on the outer surface of an unprocessed. At the same time a changed particle feeder pipe 61 is disposed within the masking holder 51 in a vertically movable manner.

At the upper portion of the masking holder 51 a suction duct 52 connected to an exhaust duct 52a of doughnut shape is provided. The masking holder 51 serves as a hood for forming a charged resin powder flow 61b sucked through the neck portion of the unprocessed tube 50 and the ducts 52 and 52a and a suction gas flow represented by an arrow 53. In addition, above the doughnut-shaped exhaust duct 52a a hood plug 67 is fitted concentrically to the doughnut-shaped exhaust duct 52 and the neck portion of the unprocessed tube. At the center of the hood plug 67 a rod-shaped electrode 68 is concentrically disposed by means of an insulator 69 for establishing an electric field inside of the neck portion that is inserted into the interior of the neck portion. Furthermore, on the inner surface of the hood plug 67 a cylindrical electrode 66 is concentrically disposed for establishing an electric field in the space between said cylindrical electrode 66 and the neck outer surface and shoulder outer surface of the unprocessed tube, and a high voltage is applied to this electrode 66 from a high voltage D.C. source 70, so that charged powder particles passing through the interior of the unprocessed tube and being ejected outwardly therefrom as represented by the arrow 61b, are adapted to form a rigid powder layer on the inner and outer surfaces of the neck portion and on the outer surface of the shoulder portion. Since the structure is such that a thin annular gap space 73 may be formed between the lower end of the hold plug 67 and the upper end of the masking holder 51, the distribution of gas, air and charged synthetic resin powder conveyed thereby which are sucked externally from the neck portion of the unprocessed tube 50, will become uniform. It is to be noted that desirably the apparatus is constructed in such manner that the flow rate of the suction air flow as represented by the arrow 53 may be exactly preset and controlled by means of a suction air control device not shown in the drawings. The charged particle feeder pipe 61 has a baffle plate 65 disposed concentrically at its upper end portion. The masking holder 51 is fitted around its outer surface. A feeder pipe cover 62 is disposed concentrically to the charged particle feeder pipe 61. At the lower portion of the feeder pipe, cover 62 is disposed a doughnut-shaped lower exhaust duct 76 which communicates through a doughnut-shaped communication opening 63, and the exhaust gas, as represented by an arrow 64, is sucked through the space 74 formed between the charged particle feeder pipe 61 and the feeder pipe cover 62 and through this exhaust duct 76. It is also desirable to exactly preset and control the flow rate and timing of the exhaust gas. Reference numeral 78 designates bellows for adjusting the length of the feeder pipe cover 62. Synthetic resin powder 54 stored in a hopper is transported through a powder feeding device 55 by driving air 58 applied via deflectors 56 and 77 as shown at 57, is passed through a resin powder charging device 59 that is connected to a voltage source 60 jointly with the feeder pipe 61 to be turned into charged synthetic resin powder which is passed through the charged particle feeder pipe 61, and is ejected from the end of the charged particle feeder pipe 61 as represented by numeral 79. In the illustrated embodiment, from the high voltage source 60, a voltage is applied to the particle charging device 59 and at the same time a predetermined voltage as described previously is adapted to be applied to the charged particle feeder pipe.

The steps for forming a rigid powder layer made of charged synthetic resin powder on predetermined locations of an unprocessed tube 50 are, for example, as fully described in the following. That is, at first the charged particle feeder pipe 61 is inserted into the interior of the unprocessed tube 50 and stopped at an upper position represented by 61c. Then, since the feeder pipe cover 62 is fixedly secured to the charged particle feeder pipe 61, it reaches a position represented by 62c at the same time, and once there stops. With regard to whether the feeder pipe 61 is moved or the unprocessed tube side is moved in this case, either one could be employed conveniently depending upon the construction of the apparatus. As soon as the charged particle feeder pipe 61 has been inserted up to the position represented by 61c and stopped there, ejection of charged synthetic resin powder from the top end of the feeder pipe 61 is commenced. At the same time, suction of air as represented by the arrow 53 and exhaust of air as represented by the arrow 64 is started. Accordingly, simultaneously therewith or after a little pause, the charged particle feeder pipe 61 is relatively withdrawn from the unprocessed tube 50 at a predetermined speed. A portion of the charged particles ejected from the tip end of the feeder pipe 61 during the period follows the route represented by an arrow 61b, and owing to an electric field formed in the space 75 by the rod-shaped electrode 68 and the cylindrical electrode 66, a rigid powder layer can be formed on the inner and outer surfaces of the neck portion of the unprocessed tube 50. Also a rigid powder layer 71 is formed successively towards the lower end of the inner surface on the inner surface of the unprocessed tube 50 starting from the top end of the inner surface of the unprocessed tube 50. Feeding of powder particles is stopped when the upper end of the charged particle feeder pipe 61 has passed the lower end of the unprocessed tube, and thereby formation of a continuous powder layer covering essential parts of the unprocessed tube is completed in one process. The suction of air as represented by arrow 53 is in some cases continued over the entire period of the process, or in other cases, it is stopped in the initial step of starting to withdrawn the charged particle feeder pipe 61, and such matters are appropriately determined depending upon the geometrical configuration of the unprocessed tube 50 as well as a manufacturing speed. With regard to the exhaust of air as represented by an arrow 64, normally the exhaust is effected over the entire period of the operation as described in detail above, whereby occurrence of various faults during a long period of continuous operation such that over-sprayed synthetic resin powder is scattered externally of the apparatus resulting in contamination of the environment, can be prevented preliminarily.

It is to be noted that the operation of the apparatus according to the present invention should not be limited to the operation mode as fully described above. For instance, the ejection of powder is not limited to the period of withdrawing the charged particle feeder pipe 61 but it could be effected both upon insertion and upon withdrawal of the charged particle feeder pipe or over a period forming a part of the insertion and withdrawal. In addition, the delivery of the charged particle mixed gas to the outside of the neck portion is not limited to the suction effect from the outside of the neck portion, but instead, the dynamic pressure of the charged particle mixed gas can be utilized by making the tip end of the feeder pipe 61 approach to the inner surface of the neck portion.

A metallic squeeze-out tube having a rigid powder layer formed on its upper portion through a series of steps as described in detail above, is removed from the masking holder, and is subjected to baking of the resin in an oven at a predetermined temperature for a predetermined period of time, and thereby a continuous resin layer rigidly and tightly adhered to the squeeze-out tube can be formed. At this point manufacture of a metallic squeeze-out tube according to the present invention has been completed. Details of the method for mounting an unprocessed tube into a masking holder and the method for demounting a tube after formation of a powder layer, are illustrated in FIG. 6. FIG. 6 shows the intermediate state in the process of demounting from a masking holder 51 a metallic squeeze-out tube which has a rigid powder layer formed at its predetermined locations. More particularly, a hood plug 67 which has been inserted into the upper portion of the masking holder 51 is removed by a demounting device not shown in the drawings. Thereby the metallic squeeze-out tube 50 can be removed by pressing downwardly upon the shoulder of the metallic tube 50 from above by means of a metallic squeeze-out tube push-out member 80 inserted into the masking holder from its upper portion and having four sharp needles 81 at its tip end. In this case, since the tips of the needle 81 provided at the tip end of the push-out member 80 and adapted to make contact with the outer surface of the shoulder of the metallic tube have a sharp shape, these needles scarcely destroy the powder layer formed on the outer surface of the shoulder of the metallic squeeze-out tube. Also, since it is very rarely that the corrosive content may reach this portion during normal use of a metallic squeeze-out tube, no practical inconvenience will occur even if the powder layer formed at the shoulder portion should be slightly destroyed by pushing this portion with the push-out member 80. The metallic squeeze-out tube having a rigid powder layer formed on its upper portion in the above-described manner, can be automatically demounted from the masking holder 51 by the push-out member 80 and can be placed on a conveyor device or the like that is not shown in the drawings, without destroying the powder layer for practical purpose. A device for mounting an unprocessed tube to this masking holder 51 prior to starting of operation of the apparatus according to the present invention, is shown at 82 in FIG. 6. The mounting can be easily carried out by using the mandrel shown at 82 in such manner that this mandrel 82 is inserted into the interior of the unprocessed tube which does not have a powder layer formed thereon to push the unprocessed tube into the interior of the masking holder and set the tube within the masking holder.

In case it is unnecessary to form an anti-corrosion synthetic resin layer on the screw thread portion and on the outer surfaces of the neck and shoulder portions as shown in FIG. 2, then a hood plug 67a having a modified form as shown in FIG. 7 could be used. The function and method of operation of this modified embodiment are exactly the same as those of the masking holder and hood plug described in detail above with reference to FIG. 5, except for the point that a masking device 90 for the screw thread portion is provided under the hood plug 67a, suction of air as represented by an arrow 53 is effected through a large number of air exhaust ports 73a towards a doughnut-shaped air exhaust duct 52, and a rigid synthetic resin powder layer terminating at the top end of the neck portion as shown in FIG. 7 can be formed. In this modified embodiment, when the hood plug 67a has been removed, the upper portion of the masking holder 51 assumes exactly the same condition as illustrated in FIG. 6, so that it is equally possible to demount the metallic squeeze-out tube which has a powder layer formed thereon, from the masking holder by means of the push-out member 80.

A synthetic resin coating film on the metallic squeeze-out tube according to the present invention can be arbitrarily controlled with respect to its film thickness without generation of pin holes in the range of 50 to 300 microns, for example, in the case polyethylene resin or the like is used, and it can maintain an anti-corrosion property for the inner metallic tube, and also it can retain shape-preservability of the tube. Also, since the coating film on the inner and outer surfaces can be formed in different thicknesses, re-machining of a screw thread portion is not required. However, in case the inner diameter of the neck portion of the metallic squeeze-out tube is relatively small, then the gap space formed between the inner surface of the neck portion of said metallic squeeze-out tube and a field-forming rod-shaped electrode 68 becomes very narrow, so that it becomes difficult in the case of mass production to maintain a concentric relationship therebetween, and thereby sometimes unevenness will occur in the film thickness of the powder layer formed on the inner surface of the neck portion. In some cases the powder layer formed on the inner surface of the neck portion becomes too thick, resulting in blocking of the inner space of the neck portion by the powder early in the powder layer forming process, so that feeding of charged resin powder for forming a powder layer on the outer surfaces of the neck and shoulder portions is interrupted, resulting in insufficient formation of the powder layer on the outer surfaces of the neck and shoulder portions. In addition, since the flow rate of the gaseous mixture consisting of the powder and air that is supplied out of the metallic squeeze-out tube through the neck portion becomes small, the wind velocity passing through the narrow annular gap space 73 provided for the purpose of forming a powder layer on the outer surface of the neck and shoulder portions uniformly along their circumferential direction becomes very low. Thereby the pressure fall in the annular gap space 73 is reduced to a small value, so that the flow rate distribution of the gaseous mixture consisting of the powder and air supplied out of the metallic squeeze-out tube through the neck-portion becomes non-uniform circumferentially, and at the same time, the powder which has failed to adhere to the metallic squeeze-out tube surface deposits in this annular gap space 73 because of the low wind velocity at that gap space, resulting in further enhancement the unevenness of a powder layer formed on the shoulder portion, and in some cases, the formation of the powder layer becomes difficult.

Now a modified embodiment of the apparatus for forming a powder layer according to the present invention will be described in detail in the following, which, in the case of a metallic squeeze-out tube having a neck portion of small inner diameter, has an especially high reliability of operation. The modified embodiment can manufacture the metallic squeeze-out tube at a high speed and at a low cost and with a stability of the properties of the film formed on the inner and outer surfaces of the neck portion and on the outer surface of the shoulder portion which is very high, the finish is beautiful, and the controllable range of the coated film thickness is wide.

Similarly to the above-described embodiment, the modified apparatus comprises a powder feeding and charging device for ejecting charged resin powder from the top opening of the field-forming charged particle feeder pipe 61 that is disposed concentrically within the body portion 1 of the squeeze-out tube 50 in a vertically movable manner opposite to and spaced from the body portion as shown in FIG. 8. In FIG. 8, only a field-forming charged particle feeder pipe 61 as inserted into the interior of a metallic squeeze-out tube and a high voltage D.C. source 60 are illustrated, the other devices on the feeder pipe side being omitted from the illustration. To a cylindrical electrode 66 that is opposite to and spaced from the outer surfaces of the neck and shoulder portions, is applied a voltage having the same polarity and substantially the same magnitude as the voltage applied to the field-forming cylindrical charged particle feeder pipe 61 by a high voltage D.C. source 70. The electric field generated by this applied high voltage extends through the narrow annular gap space 73 that is formed in a ring shape around the shoulder portion of the squeeze-out tube by the hood plug 67, up to the exhaust duct 52a, so that the remaining part of the gaseous mixture containing the charged particles ejected from the charged particle feeder pipe 61 forming a cylindrical electrode, can be electrostatically attracted and exhausted through this annular gap space 73 as indicated by the arrow representing the air exhaust.

In addition, around the upper end of the body portion of the metallic squeeze-out tube 50 is formed a cylindrical gap space 92 communicating with a gas inlet port 91 that opens to the exterior, and as shown by an arrow 93, gas is adapted to be introduced through this inlet port. Reference numeral 94 designates a control member for controlling the gas flow through the inlet port 91 as represented by the arrow 93. Therefore, the rate of the exhaust gas flow passing through the annular gap space 73 is equal to the sum of the flow rate of the gas derived from the inside of the neck portion of the metallic squeeze-out tube to the outside of the neck portion plus the flow rate of the gas introduced externally as represented by the arrow 93, and the total amount of these is sucked out through the gap space 73 as represented by the arrow 53, so that the wind velocity through the annular gap space 73 can be selected at a sufficiently high value. Therefore, a blocking accident at the annular gap space 73 caused by the remaining charged particles which could not adhere to the squeeze-out tube as a powder layer, will never occur. Also, since the pressure fall at the annular gap space 73 is sufficiently large, the gaseous mixture derived from the interior of the metallic squeeze-out tube through its neck portion to its exterior, can be uniformly distributed circumferentially on the outer surfaces of the neck and shoulder portions, so that evenness of the powder layer formed on the outer surfaces of the neck and shoulder portions can be improved. Furthermore, owing to the existence of the air flow sucked through the cylindrical gap space 92, the edge portion of the powder layer formed on the outer surface of the shoulder portion is definitely limited, and so, a great advantage is attained in that the commercial value of the coated metallic squeeze-out tube obtained as a final product after heating and baking the powder layer, can be improved.

In the apparatus for forming a powder layer on a surface of a metallic squeeze-out tube according to the present invention, since the flow rate of the air introduced externally as shown by the arrow 93 can be selected at a sufficiently high value, the wind velocity of the gaseous mixture consisting of charged particles and gas as represented by the arrow 61b upon passing through the neck portion of the metallic squeeze-out tube can be selected at a relatively low value, so that a sufficiently rigid powder layer can be formed on the inner surface of the neck portion by the electric charge borne by the charged particles per se and the electric field formed on the inner surface of the neck portion of the metallic squeeze-out tube. Further, since the flow velocity of the gas and charged particles at the top end of the neck portion is also very slow, the formation of the powder layer on the top end and outer surface of the neck portion can be achieved in a sufficiently reliable manner owing to a strong electric field formed between the electrode 68a and the neck portion. In addition, since the field-forming rod-shaped electrode 68 to be concentrically inserted into the interior of the neck portion is omitted, the above-described problems arising upon coating a metallic squeeze-out tube having a small inner diameter of a neck portion, such as unevenness of a powder layer formed on the inner surface of the neck portion or occurrence of a blocking accident in the interior of a neck portion caused by powder during coating of an inner surface of the neck portion, can be resolved. Thereby there is obtained an apparatus for forming a powder layer on a surface of a metallic squeeze-out tube which can operate at a high speed and which can produce a metallic squeeze-out tube of high quality.

In the apparatus shown in FIG. 8, while the electrode 68a opposite the top end of the neck portion of the metallic squeeze-out tube can, in some cases, sufficiently form a powder layer only by establishing an electric field without effecting any discharge, the flow velocity of the mixture of charged particles and air passing through the interior of the neck portion of the metallic squeeze-out tube can be increased by providing at this location a corona discharge electrode having such degree of length that it does not extend to the interior of the neck portion of the metallic squeeze-out tube. Thereby it is possible to further enhance the production capability of metallic squeeze-out tubes.

FIG. 9 shows a modified embodiment in which synthetic resin coating films are not formed on the screw thread portion outside of the neck and on the outer surface of the shoulder portion, but the synthetic resin coating films are formed only on the inner surface and on the top end of the neck portion of the metallic squeeze-out tube. It is to be noted that in FIG. 9 the conditions of flow of the powder and gas are illustrated but the electrical connections and voltage sources are omitted from the illustration. With reference to FIG. 9, gas is introduced externally through a gas inlet port 91 and a cylindrical gap space 92 provided around the outer surface of the neck portion of the metallic squeeze-out tube as shown by the arrow 93, and this externally introduced gas is mixed with the mixture 61b of charged particles and gas which has been supplied from the interior of the metallic squeeze-out tube to its exterior through its neck portion, and is exhausted externally through an annular gap space 73 and a duct 52a as shown by the arrow 53.

Identically to that described in detail above with reference to FIG. 8, it becomes possible, owing to the existence of the gas flow introduced externally as represented by an arrow 93, that within the gaseous mixture of the charged powder particles and gas ejected from the tip end of the charged particle feeder pipe 61 which also serves as a field-forming cylindrical electrode, the portion supplied out of the metallic squeeze-out tube through its neck portion as shown by 61b distributes uniformly circumferentially along the outside of the squeeze-out tube and forms a powder layer having good evenness over the top end of the metallic squeeze-out tube. In addition, depending upon the shape of the metallic squeeze-out tube, in some cases, additional inlet port 95 penetrating through the cylindrical electrode 66 is provided for introducing another gas flow as represented by an arrow 96 from outside of the metallic squeeze-out tube, and thereby prevention of adhesion of the powder particles onto the inner surface of the electrodes 66 and 68b and other effects can be achieved. In addition, the electrode 68b serves as a discharge electrode for forming a rigid powder layer on the outer top end of the metallic squeeze-out tube at a high speed and at a high efficiency. Control members for controlling the flow rates of the gas flows 93 and 96 are omitted from illustration in FIG. 9.

In the apparatuses for forming a powder layer on a surface of a metallic squeeze-out tube accordind to the present invention illustrated in FIGS. 8 and 9, in order to remove the synthetic resin powder accumulated on the inner surface of the cylindrical electrode 66, the inside of the cylindrical electrode 66 can be cleaned by making use of the air inlet port 91 for the air flow 93 or the air inlet port 95 for the air flow 96 either before or after mounting of a metallic squeeze-out tube.

Now two examples of test operation of the apparatus according to the present invention will be described in the following:

EXAMPLE 1

A metallic squeeze-out tube consisting of a body portion of 30 mm in inner diameter and 120 mm in length and a neck portion of 8 mm in inner diameter and 15 mm in length, was used for the test. A D.C. voltage of 4500 V was applied to a charged particle feeder pipe of 10 mm in outer diameter which serves as a field-forming cylindrical electrode. The charged particle feeder pipe was inserted into the metallic squeeze-out tube concentrically therewith at a speed of 6 cm/sec. while charging and ejecting from its tip end synthetic resin powder at at rate of 25 g/min. starting from a time point 0.2 seconds prior to the insertion, the advance of the charged particle feeder pipe was once stopped at a point corresponding to an insertion length of 100 mm, it was kept stationary there for 0.4 seconds, thereafter it was withdrawn at the same speed as that of insertion while ejecting charged powder particles, and even after the charged particle feeder pipe had come out of the metallic squeeze-out tube, the ejection of synthetic resin powder was continued for 0.2 seconds. Into the neck portion of the metallic squeeze-out tube was concentrically inserted a field-forming rod-shaped electrode 68 of 1.5 mm in outer diameter coated with a semiconductor film, and a voltage of 1000 V was applied to this electrode. In addition, a voltage of 4500 V was applied to the cylindrical electrode 66, denatured polyethylene powder was used as the synthetic resin, and the operation was conducted by making use of the apparatus as illustrated in detail in FIG. 5. When the formed powder layer had been baked at a temperature of 160° C., an extremely rigid synthetic resin film of 120 microns in thickness which was quite free from pin holes, was formed on the inner surface and on the outer surfaces of the neck and shoulder portions. By repeating the same operation, manufacture of metallic squeeze-out tubes each having a coating film formed on its inner surface and on the outer surfaces of its neck and shoulder portions, has become industrially possible.

EXAMPLE 2

A metallic squeeze-out tube consisting of a body portion of 25 mm in inner diameter and 120 mm in length and a neck portion of 4 mm in inner diameter and 15 mm in length, was used for the test. A charged particle feeder pipe of 10 mm in outer diameter which serves as a field-forming cylindrical electrode was inserted concentrically into the metallic squeeze-out tube at a speed of 12 cm/sec., sufficiently charged polyethylene powder was ejected jointly with air from the tip end of the charged particle feeder pipe from a time point 0.3 seconds prior to the insertion of the charged particle feeder pipe into the metallic squeeze-out tube. The advance of the charged particle feeder pipe was once stopped at a point corresponding to an insertion length of 11 cm. Subsequently the charged particle feeder pipe was withdrawn at a speed of 12 cm/sec. while continuously ejecting charged polyethylene powder from the tip end of the charged particle feeder pipe, and even after the charged particle feeder pipe had come out of the bottom end of the metallic squeeze-out tube, the ejection of the charged particles was continued for 0.3 seconds. A voltage of 4500 V was applied to the charged particle feeder pipe, the same voltage of 4500 V was also applied to the cylindrical electrode 66, and the air flow introduced externally was sucked at a rate of 5 l/min. After heating and baking, a tightly adhered synthetic resin layer of 75 microns in thickness that was free from pin holes, could be formed on the inner surface and on the outer surfaces of the neck and shoulder portions of the metallic squeeze-out tube. By this test operation it was proved possible to industrially manufacture metallic squeeze-out tubes having a synthetic resin coating film formed on its surface at a high speed and continuously, and to perform stable continuous operations over a long period of time.

What is claimed is:

1. A metallic squeeze-out tube including inner and outer surfaces, a neck portion having inner and outer surfaces, and a shoulder portion having inner and outer surfaces and having a continuous resin coating film formed over and tightly adhered to the inner surface of both said tube and neck, the outer surface of the neck portion and the outer surface of the shoulder portion of the metallic squeeze-out tube, said resin coating formed of powder paint particles electrostatically adhered to said surfaces and fused together to provide a solidified film layer tightly adhered to said surfaces 2. A coated metallic squeeze-out tube comprising a body, a neck and a shoulder interconnecting said body and neck, each of said body, neck and shoulder having inner and outer surfaces, said neck including an end surface; a continuous, thin, generally even, synthetic resin coating film tightly adhered to the entirety of said inner surface of said neck and shoulder portions and to generally the entire inner surface of said body, and to said end surface of said neck, said film being a single layer free from pinholes and discontinuities and formed of powder paint particles electrostatically adhered to said surfaces and fused together to provide a solidified film layer on said surfaces, whereby said coating prevents corrosion of the covered surfaces of said tube.

3. The coated tube of claim 1 wherein said outer surface of said neck includes screw-threads formed thereon; said synthetic resin coating film extending continuously from said neck end surface over and being tightly adhered to said outer neck surface including said screw-threads and at least a portion of said outer surface of said shoulder.

4. The coated tube of claim 2 wherein said synthetic resin coating film is tightly adhered to the entire neck outer surface.

5. The coated tube of claim 3 wherein said neck end surface, said outer neck surface including said screw-threads, and at least the said portion of said outer surface of said shoulder which is coated with said synthetic resin coating film include a second synthetic resin coating film layer applied directly to and covering the said coated surface portions, said second coating film layer having a high abrasion resistance.

6. The coated tube of claim 1 wherein said neck has a diameter less than that of said body, said outer neck surface including screw-threads formed thereon, said shoulder being in the shape of a truncated cone and sloping between said neck and body to connect the same; said synthetic resin coating film extending continuously from said neck end surface over and being tightly adhered to said outer neck surface including said screw-threads and at least a portion of said outer surface of said shoulder; said synthetic resin coating film extending downwardly along a portion of the slope of said outer shoulder surface such that it covers the outer surface area of said tube at the transition between said neck and shoulder.

7. The coated tube of claim 1 wherein said body has an end opposite said neck;
a portion of said inner surface adjacent said end of said body opposite said neck being uncoated by said synthetic resin coating film.

8. A metallic squeeze-out tube including inner and outer surfaces, a neck portion having an upper end surface and inner and outer surfaces, and a continuous resin coating film formed over and tightly adhered to the inner surface of said tube and neck and said upper end surface of said neck, said resin coating film formed of powder paint particles electrostatically adhered to said surfaces and fused together to provide a solidified film layer tightly adhered to said surfaces.

* * * * *